United States Patent [19]
Hirose

[11] Patent Number: 5,395,065
[45] Date of Patent: Mar. 7, 1995

[54] FISHLINE LENGTH MEASURING DEVICE FOR FISHING REEL

[75] Inventor: Haruomi Hirose, Tokyo, Japan

[73] Assignee: Daiwa Seiko, Inc., Tokyo, Japan

[21] Appl. No.: 847,905

[22] Filed: Mar. 5, 1992

[30] Foreign Application Priority Data

Mar. 5, 1991 [JP] Japan .................. 3-038671

[51] Int. Cl.$^6$ .......................... G01B 5/18; G04F 3/00; A01K 89/015
[52] U.S. Cl. ..................................... 242/223; 33/716; 367/99
[58] Field of Search .................. 242/223; 33/715, 716, 33/719; 367/99, 100, 101

[56] References Cited

U.S. PATENT DOCUMENTS

| | | | |
|---|---|---|---|
| 4,620,371 | 11/1986 | Murakami et al. | 33/719 |
| 4,697,758 | 10/1987 | Hirose et al. | 242/223 |
| 4,739,860 | 4/1988 | Kobayashi et al. | 367/99 X |
| 4,918,672 | 4/1990 | Iwabuchi et al. | 367/99 |
| 5,060,205 | 10/1991 | Phelan | 367/99 X |
| 5,219,131 | 6/1993 | Furomoto | 242/223 |
| 5,236,147 | 8/1993 | Kaneko | 242/223 |

FOREIGN PATENT DOCUMENTS 60-244247 12/1985 Japan .
1307612 12/1989 Japan .

Primary Examiner—Daniel P. Stodola
Assistant Examiner—Michael R. Mansen
Attorney, Agent, or Firm—Longacre & White

[57] ABSTRACT

A fishline length measuring device adapted to a fishing reel having a spool rotatably supported on a reel body for winding and unwinding a fishline thereon. The device has a spool rotation sensor for detecting a direction of the rotation of the spool and for detecting a number of the rotation of the spool, and a ultrasonic wave beam sensor for applying an ultrasonic wave beam onto a surface of the fishline wound on the spool and for receiving the ultrasonic wave beam emitted therefrom and reflected by the surface of the fishline wound on the spool. A timer measures a time period ΔT between the emission and reception of the ultrasonic wave beam by the ultrasonic wave beam sensor. The time period ΔT, the direction of the rotation and the number of the rotation are used for calculating a fishline length wound onto or unwound from the spool due to the rotation of the spool.

19 Claims, 11 Drawing Sheets

FISHLINE LENGTH MEASURING DEVICE FOR FISHING REEL

BACKGROUND OF THE INVENTION

The present invention relates to a fishline length measuring device for a fishing reel, and more particularly relates to a device capable of accurately measuring the unwound and wound lengths of a fishline in terms of the number of the revolutions of the spool of a fishing reel.

A fishing reel developed recently is capable of measuring the unwound and wound lengths of a fishline from and onto the spool of the reel to make it possible to place a fishhook at the depth of the presence of a fish or to detect the distance of the casting of the fishhook to judge where the fishhook has landed on water.

In a conventional device for measuring the unwound and wound lengths of a fishline data on a formula which represents the relationship between the wound quantity of the fishline and the diameter of the winding of the fishline on the spool of a fishing reel and includes the thickness of the fishline as a parameter, and data on the total length of the fishline and so forth are entered into a microcomputer on the body of the reel through a keyboard in advance so that in order to measure the unwound or wound length of the fishline, the rotation of the spool is detected by a sensor, pulses sent out from the sensor are counted by a counter, the count of the counter is entered into the microcomputer at every calculation period, a fishline length calculation formula corresponding to the thickness of the fishline is selected, the unwound or wound length of the fishline is calculated on the basis of the formula, and the result of the calculation is entered into a display unit to digitally indicate the calculated length to the fishing person, as disclosed in the Japan Patent Unexamined Publication No. Sho. 60-244247. However, every time the fishline is replaced with another one, data on the thickness and total length of the latter fishline wound on the spool need to be entered into the microcomputer by manipulating the keyboard. This entering manipulation is troublesome. Since the fishline length calculation formula is a quadratic or cubic equation, it takes much time for the microcomputer to calculate the unwound or wound length of the fishline if the calculation capacity of the microcomputer is low. When the speed of the unwinding of the fishline is high as in the casting thereof, the speed of the calculation of the unwound length of the fishline is lower than the former speed to make it impossible to instantaneously indicate the unwound length changing with the lapse of time. If the fishline length calculation formula is simplified, the length cannot accurately be measured. These are problems.

The present application then developed a fishline length measuring device which is for a fishing reel and does not have those problems. The applicant disclosed the device in the Japan Patent 1-307612. The device includes a sensor for detecting the rotation of the spool of the reel, which is rotatably supported by the body of the reel and on which a fishline is wound, an up/down counter by which pulses sent out from the sensor are counted up or down, a light emitter for irradiating a spot of light upon the surface of the fishline wound on the spool, a fishline winding diameter detector which has a position sensor for detecting the position of a spot of the light reflected by the surface of the wound fishline after being emitted from the emitter and converts the detected position into an electric signal proportional to the diameter of the winding of the fishline, a means for calculating the unwound length of the fishline in terms of the electric signal and the count of the counter, and a display unit for indicating the length calculated by the means. When the light spot is irradiated upon the surface of the wound fishline on the spool by the light emitter, the position of the spot of the light reflected by the surface after being emitted from the emitter is detected by the position sensor of the fishline winding diameter detector and then converted into the electric signal proportional to the diameter of the winding of the fishline on the spool. The unwound length of the fishline from the spool is calculated by the means in terms of the signal and the count of the counter, which corresponds to the number of the revolutions of the spool in the unwinding or winding of the fishline. The unwound or wound length of the fishline can thus be quickly and accurately determined. Besides, since parameters such as the thickness and total length of the fishline are not needed for the determination, the manipulating property of the device if higher.

Since the spot of the light is irradiated upon the surface of the fishline on the spool by the fishline length measuring device disclosed in the above-mentioned Application No. Sho. 63-137764, the light emitted from the light emitter such as a light emission diode and a semiconductor laser element needs to be converged on the surface of the fishline by an optical unit such as a lens. The light reflected by the surface of the wound fishline on the spool after being emitted from the emitter also needs to be converged on the position sensor by another optical unit. Because of the presence of the optical units, it is very difficult to make the sensor section of the fishline winding diameter compact. Since the range of the diameter of the winding of the fishline, which can be measured through the use of a single optical unit, is limited, the unit needs to be replaced depending on the size of the reel. These are problems.

SUMMARY OF THE INVENTION

The present invention was made in order to solve the problems. Accordingly, it is an object of the present invention to provide a fishline length measuring device which is small in size and weight and can be applied to various sizes of fishing reels.

In order to attain the above-noted and other objects, the present invention provides a fishing reel comprising: a reel body; a spool rotatably supported on the reel body for winding a fishline thereon; sensing means for detecting a rotation of the spool; an up/down counter for up/down counting pulse signals output from the sensor means; measuring means for measuring a fishline winding diameter of a fishline wound on the spool by emitting an ultrasonic wave beam onto a surface of the fishline wound on the spool; calculating means for calculating a length of the fishline on the basis of the measured fishline winding diameter and the counted pulse signals; and a display for indicating the calculated length of the fishline.

The measuring means may include sending means for emitting the ultrasonic wave beam onto the surface of the wound fishline, reception means for receiving the ultrasonic wave beam reflected by the surface of the wound fishline, a timer for measuring a time period between the emission of the ultrasonic wave beam by the sending means and the reception of the ultrasonic wave beam by the reception means, and fishline winding diameter detecting means for converting the measured time period into an electric signal which is in proportion to the fishline winding diameter.

The sending and reception means may be comprised of a single common ultrasonic wave sensor, or otherwise may include two separate ultrasonic wave sensors.

The measuring means may be constructed by including sending means for applying a frequency modulated sending voltage onto a ultrasonic wave sensor to emits a ultrasonic wave beam from the sensor onto the surface of the fishline wound on the spool, reception means for receiving the ultrasonic wave beam reflected by the surface of the wound fishline to obtain reception voltage induced therein, distance measuring means for determining the distance between the sensor and the surface of the wound fishline in terms of a frequency of a beat signal generated by mixing the sending voltage and the reception voltage with each other, and fishline winding diameter calculation means for calculating data indicative of the fishline winding diameter.

The sensor(s) can be mounted on any portion of the reel where the sensor can be confronted with the fishline wound on the spool, but preferably is provided between side plates of the reel body above the spool or behind the spool, the sensor provided on that portion being prevented from hindering the operation of the reel.

The present invention further provides a fishline length measuring device adapted to a fishing reel having a spool rotatably supported on a reel body for winding and unwinding a fishline thereon, said fishline length measuring device comprising: first means for detecting a direction of the rotation of the spool and providing a first signal indicative thereof; second means for detecting a number of the rotation of the spool and providing a second signal indicative thereof; third means for applying an ultrasonic wave beam onto a surface of the fishline wound on the spool and providing a third signal indicating the emission of the ultrasonic wave beam therefrom; fourth means for receiving the ultrasonic wave beam emitted from the third means and reflected by the surface of the fishline wound on the spool and providing a fourth signal indicating the reception of the reflected ultrasonic wave beam thereby; fifth means for measuring a time period ΔT between the generations of the third signal and of the fourth signal, and providing a fifth signal indicative thereof; and sixth means for calculating a fishline length wound onto or unwound from the spool due to the rotation of the spool based on the first, second and fifth signals.

The device preferably comprises seventh means for displaying the fishline length calculated by the sixth means.

The third and fourth means include a common ultrasonic wave sensor used for both emitting the ultrasonic wave beam therefrom and receiving the reflected ultrasonic wave beam thereby.

On the contrary, the device may comprises the third means including an ultrasonic wave sensor used only for emitting the ultrasonic wave beam therefrom, and the fourth means including another ultrasonic wave sensor used only for receiving the reflected ultrasonic wave beam thereby.

The sixth means includes means for calculating a distance d defined between the ultrasonic wave sensor and the surface of the fishline wound on the spool on the basis of the measured time period ΔT, and means for calculating a diameter D of a circle defined by the surface of the fishline wound on the spool on the basis of the distance d.

Further, the present invention provides a fishline length measuring device adapted to a fishing reel having a spool rotatably supported on a reel body for winding and unwinding a fishline thereon, said fishline length measuring device comprising: first means for detecting a direction of the rotation of the spool and providing a first signal indicative thereof; second means for detecting a number of the rotation of the spool and providing a second signal indicative thereof; third means having at least one ultrasonic wave sensor for applying an ultrasonic wave beam onto a surface of the fishline wound on the spool and receiving the ultrasonic wave beam emitted from the third means and reflected by the surface of the fishline wound on the spool; fourth means for applying frequency-modulated sending voltage to said third means to emit the ultrasonic wave beam from said third means and for inducing a reception voltage on said third means when said third means receives the ultrasonic wave beam emitted from the third means and reflected by the surface of the fishline wound on the spool; fifth means for mixing said sending voltage and said reception voltage with each other to generate a beat signal and providing a third signal indicative of a frequency fr of the beat signal; and sixth means for calculating a fishline length wound onto or unwound from the spool due to the rotation of the spool based on the first, second and third signals.

Moreover, the present invention provides a method for measuring a fishline length wound onto and/or unwound from a spool rotated relative to a reel body of a fishing reel, comprising the steps of: detecting a direction of the rotation of the spool and providing a first signal indicative thereof; detecting a number of the rotation of the spool and providing a second signal indicative thereof; detecting a fishline winding diameter D defined by a fishline wound on the spool by applying an ultrasonic wave beam onto a surface of the fishline wound on the spool and receiving the ultrasonic wave beam reflected by the surface of the fishline wound on the spool and providing a third signal indicative of the diameter D; and calculating the fishline length wound onto and/or unwound from the spool based on the first, second and third signals.

BRIEF DESCRIPTION OF THE DRAWINGS

In the accompanying drawings:

FIG. 10 is a schematic view of a fishline length measuring device which is yet another embodiment of the present invention;

DETAILED DESCRIPTION OF THE PREFERRED EMBODIMENTS

Embodiments of the present invention are hereafter described in detail with reference to the drawings attached hereto.

Figure 1:
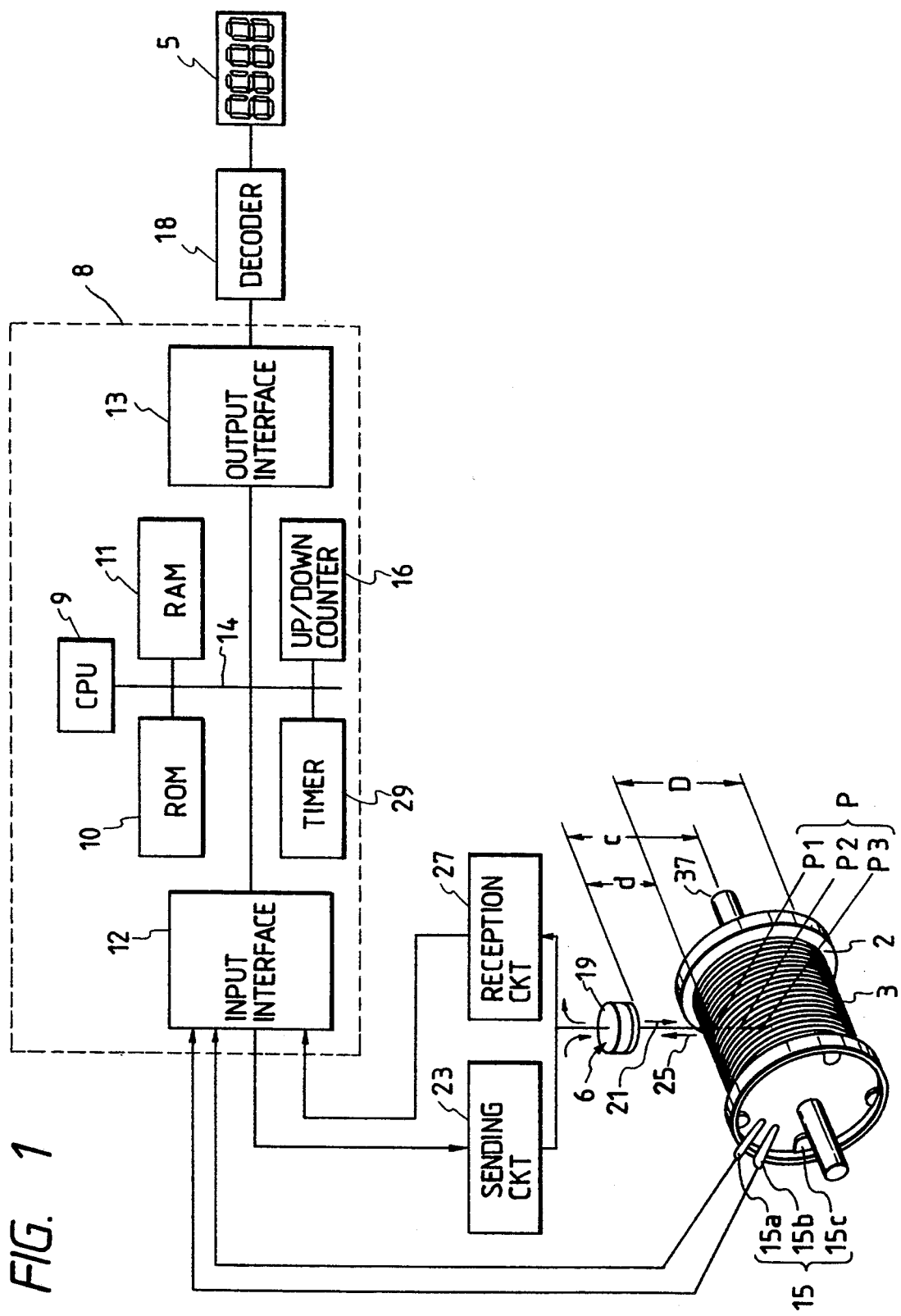
FIG. 1 is a schematic view of a fishline length measuring device which is an embodiment of the present invention.
Figure 2:
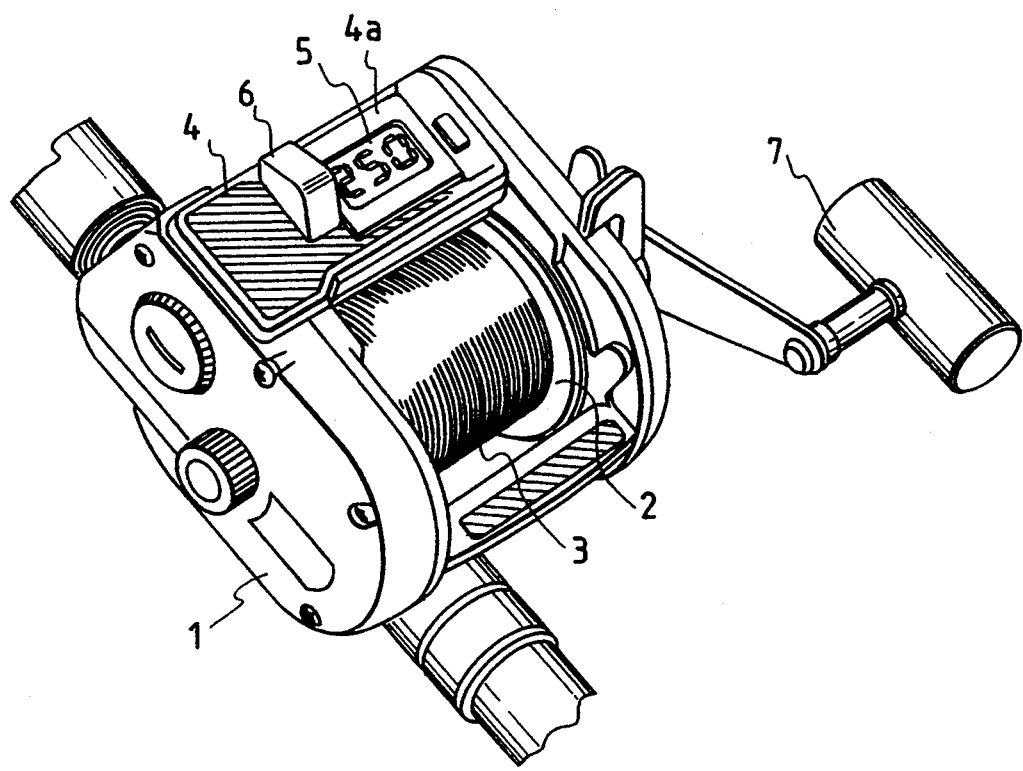
FIG. 2 is a perspective view of a fishing reel provided with the device.

FIGS. 1 and 2 shows a device which is one of the embodiments of the present invention and is for measuring the unwound and wound lengths of a fishline 3 from and onto the spool 2 of a fishing reel. As shown in FIG. 2, the spool 2 is rotatably supported by the body 1 of the reel so that the fishline 3 is wound onto and unwound from the spool. The reel has a handle 7 for rotating the spool 2 to wind the fishline 3 thereon. The device includes a waterproof flat case 4, a digital display unit 5, a fishline winding diameter detector 6, a microcomputer 8, a decoder 18, a sending circuit 23, and a reception circuit 27. The case 4 is integrally mounted on the top of the body 1 of the reel. The display unit 5 and the fishline winding diameter detector 6 are provided on the top plate 4a of the case 4. The microcomputer 8, which calculates the unwound and wound lengths of the fishline 3, a battery and so forth are accommodated in the case 4 so that water cannot enter into it.

The microcomputer 8 performs the calculation of the unwound and wound lengths of the fishline 3 on the basis of input data, outputs the calculated unwound and wound lengths, and serves for the indication of the length. The microcomputer 8 includes a central processing unit (CPU) 9, a read-only memory (ROM) 10, a random-access memory (RAM) 11, an input interface 12, an output interface 13, a bus 14, an up/down counter 16, and a timer 29, as shown in FIG. 1. The central processing unit 9 controls the memories 10 and 11, the timer 29 and the input and the output interfaces 12 and 13 to perform necessary calculations and transfers to execute a given job. A fishline length calculation program and a fishline length calculation formula are stored in the read-only memory 10. The results of the calculations performed by the central processing unit 9 are stored in the random-access memory 11. The bus 14 is for connecting the central processing unit 9 to the other components of the microcomputer 8.

The digital display unit 5 is for digitally indicating the unwound or wound length of the fishline, and is connected to the output interface 13 through the decoder 18.

The device also includes a sensor 15 which detects the number of rotation of the spool 2 and the direction of the rotation. The sensor 15 is made of a pair of reed switches 15a and 15b, and a plurality of magnets 15c secured to the peripheral portion of one side of the spool 2 so as to face the switches. A spool forward or backward rotation judgement signal generated depending on which of the reed switches 15a and 15b is turned on or off by the magnet 15c prior to the other of the switches is entered into the central processing unit 9 through the input interface 12 to set the up/down counter 16 in a state of counting increasingly or decreasingly. Spool rotation pulses generated as a result of the turning-on and turning-off of the reed switches 15a and 15b are entered into the up/down counter 16 through the input interface 12 so that the counter counts the pulses increasingly or decreasingly. Accordingly, it is possible to determine the number of rotation of the spool 2 and the direction of the rotation with this device. These determined number and direction are used for calculation of the unwound and/or wound lengths of the fishline 3 (described later).

Figure 3:
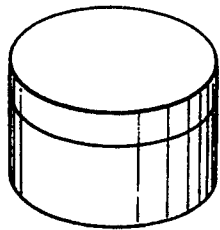
FIG. 3 is a perspective view of an ultrasonic sensor of the device.
Figure 4:
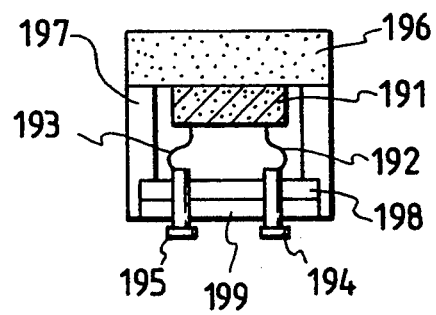
FIG. 4 is a longitudinally sectional view of the sensor.

The device further includes the fishline winding diameter detector 6 connected to the input interface 12 through the sending circuit 23 and the reception circuit 27, and also connected to the output interface 13. The detector 6 is made of an ultrasonic sensor 19 which emits an ultrasonic wave beam 21 onto the surface of the fishline 3 wound on the spool 2 and receives the beam 25 reflected by the surface. The sensor 19 is a waterproof unit having an exterior form shown in FIG. 3, and includes a piezoelectric ceramic 191, lead wires 192 and 193, terminals 194 and 195 connected to the ceramic through the wires, an acoustic matching layer 196, a metal casing 197, a base 198, and a sealing material 199, as shown in FIG. 4.

The determination of the fishline winding diameter D with use of the detector 6 will now be described. The sending circuit 23 sends a signal to the detector 6 for emitting the ultrasonic wave beam 21 to the surface P of the fishline 3 wound on the spool 2. The reception circuit 27 receives from the detector 6 a signal indicative of receiving the beam 25 reflected by the surface after being emitted from the ultrasonic sensor 19. The time period $\Delta t$ from the emission of the beam 21 from the detector 6 through the action of the sending circuit 23 to the reception of the reflected beam 25 by the detector 6 through the action of the reception circuit 27, is measured through the timer 29 of the microcomputer 8. The distance d from the detector 6 to the surface of the wound fishline 3 on the spool 2 is calculated on the basis of a formula $d = v \cdot 2/\Delta t$ which is stored in the read-only memory 10 and in which v denotes the acoustic velocity (331 m/sec.). Based on this calculated distance d, the CPU 9 determines the fishline winding diameter D with using a formula D=2(c−d), where c denotes a distance between the ultrasonic sensor 19 and an axis of the spool shaft 37.

Figure 5:
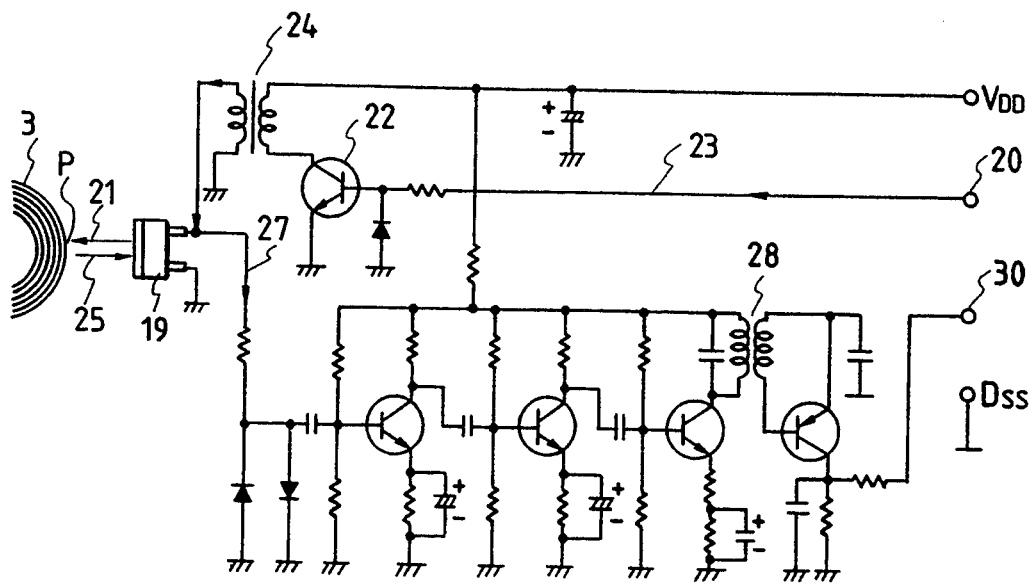
FIG. 5 is a wiring diagram of sending and reception circuits for the fishline winding diameter detector of the device.

FIG. 5 shows an example of the sending circuit 23 and the reception circuit 27. When a signal for commanding the measurement of the unwound or wound length of the fishline 3 is sent out from the central processing unit 9 to a trigger terminal 20, a transistor 22 is turned ON so that a number of high-voltage pulses, which is determined by the unit, are supplied from a pulse transformer 24 to the ultrasonic sensor 19. When the ultrasonic wave beam 25 reflected by the surface of the wound fishline 3 on the spool 2 is received by the sensor 19, a beam reception voltage is induced therein. The voltage is applied to the reception circuit 27, and processed through a plurality of amplification circuits and a detection transformer 28 so that a reception pulse is sent out from a detection terminal 30 to the input interface 12 of the microcomputer 8. The timer 29 is put into time measuring action by the measurement command signal, and put out of the action by the pulse to the input interface 12. The time period Δt from putting the timer 29 into the action to putting it out of the action is stored in the random-access memory 11, and used to calculate the distance d.

Figure 6:
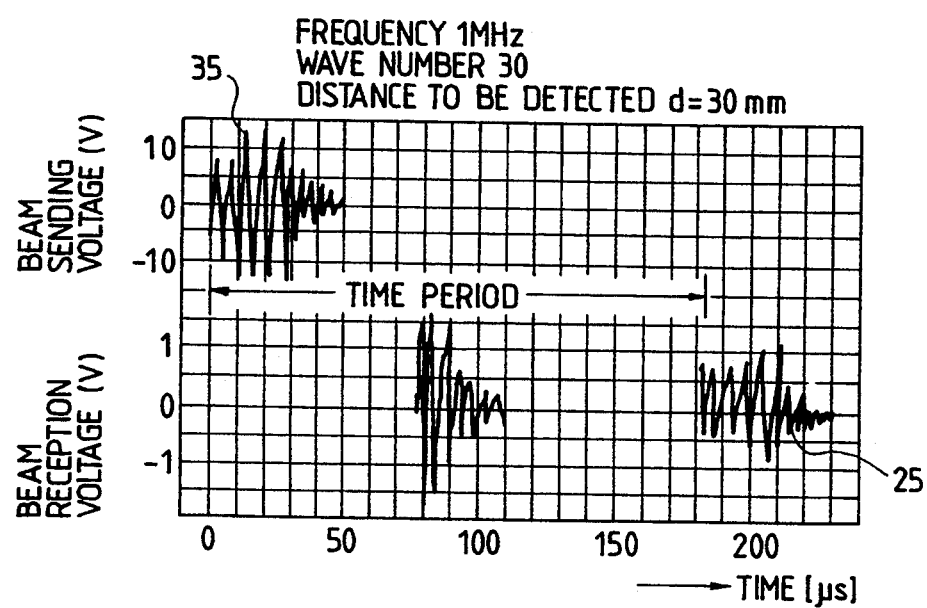
FIG. 6 is a time chart to illustrate the relationship between the emission and reception of an ultrasonic wave beam by the sensor.

A procedure of measuring the time period Δt is described with reference to FIG. 6 from now on. A beam sending voltage pulse 35 is applied to the ultrasonic sensor 19 for a duration of 30 μsec at every quarter of the revolution of the spool 6 so that the sensor emits the ultrasonic wave beam 21 to the surface of the fishline 3 wound on the spool 2. The beam 21 is reflected by the surface as shown at 25, and then comes back to the sensor 19 so that the beam reception voltage is induced therein. The voltage is amplified by the reception circuit 27 so that the reception pulse is sent out from the detection terminal 30. The time period Δt lasts from the rising of the beam sending voltage pulse 35 to the reception pulse, and is stored in the random-access memory 11. In FIG. 6, for example, the time period 181 μsec. is measured and stored. Since the distance d from the sensor 19 to the surface P of the wound fishline 3 on the spool 2 is represented by the formula d=v(Δt/2), the distance can be determined if the time period Δt is measured.

The central processing unit 9 determines the fishline winding diameter D, which is a diameter of the fishline 3 wound on the spool on the basis of the distance d, and then calculates the unwound or wound length of the fishline in terms of the diameter. The diameter D has a relationship with the distance c from the ultrasonic sensor 19 to a rotary shaft 37 for the spool 2 and the former distance d as follows:

$$D=(c-d).2$$

Therefore, the diameter D can be easily determined.

Figure 8:
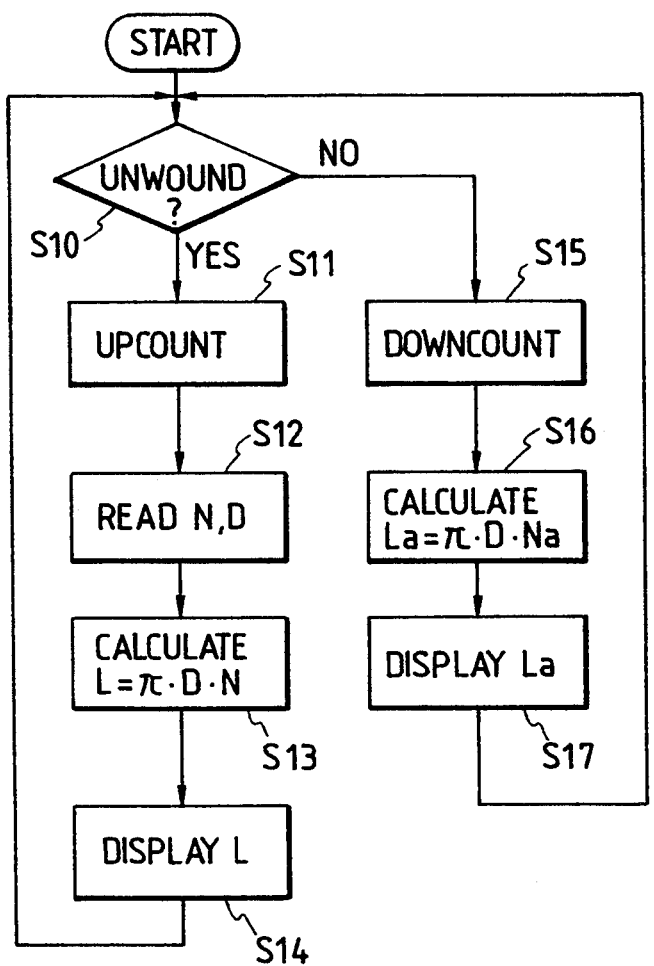
FIG. 8 is a flow chart of measuring and indicating the unwound or wound length of the fishline.

Measuring and indicating the unwound or wound length of the fishline 3 is described from now on, with reference to FIG. 8 which is a flow chart for the fishline length calculation program. When the program is started, it is judged in a step S10 whether the fishline 3 is being unwound or not. When it is judged in the step S10 that the fishline 3 is being unwound due to the fact that the spool 2 is rotated forward along with the unwinding of the fishline and a spool forward rotation signal is sent out from the sensor 15 to the central processing unit 9 through the input interface 12, the up/down counter 16 is set in a state of counting increasingly, and the spool rotation pulses, each of which is sent out from the sensor 15 at every single rotation of the spool, are entered into the counter through the input interface and counted increasingly by the counter, in a step S11. In a step S12, the count N of the counter 16 is entered into the central processing unit 9 at every calculation period of the microcomputer 8, and data indicative of the fishline winding diameter D are entered into the central processing unit 9. In a step S13, the calculation of a formula L=πDN is performed. The result of the calculation is sent out to the digital display unit 5 through the output interface 13 and the decoder 18 so that the unwound length L of the fishline 3 from the spool 2 is digitally indicated by the display unit, in a step S14.

When it is judged in the step S10 that the fishline 3 is being wound on the spool 2 due to the fact that the spool is rotated backward along with the winding of the fishline and a spool backward rotation signal is sent out from the sensor 15 to the central processing unit 9 through the input interface 12, the up/down counter 16 is set in a state of counting decreasingly, and the spool rotation pulses, each of which is sent out from the sensor at every rotation of the spool, are entered into the counter and counted decreasingly by it to subtract the number of the pulses from the already cumulated count of the counter, in a step S15. In a step S16, the count Na of the counter 16 is entered into the central processing unit 9 at every calculation period of the microcomputer 8, and the calculation of a formula La=πDNa is performed to determine the length La of the fishline 3, which is the difference between the unwound and wound lengths thereof. The length La of the fishline 3 is entered into the digital display unit 5 so that the length is digitally indicated by the unit, in a step S17.

Because of the above-described arrangement of the present invention, the fishline length measuring device can be made small in size and weight, so that the device can be easily provided for various sizes of fishing reels. In other words, since the ultrasonic sensor 19 is used to measure the distance therefrom to the surface of the fishline 3 wound on the spool 2, an optical unit such as a lens is dispensed with to make it very easy to render the distance measuring section of the device compact. Since the distance can be accurately measured by the ultrasonic sensor 19 regardless of whether the distance is short or long, the sensor can be applied to various sizes of fishing reels.

Figure 7:
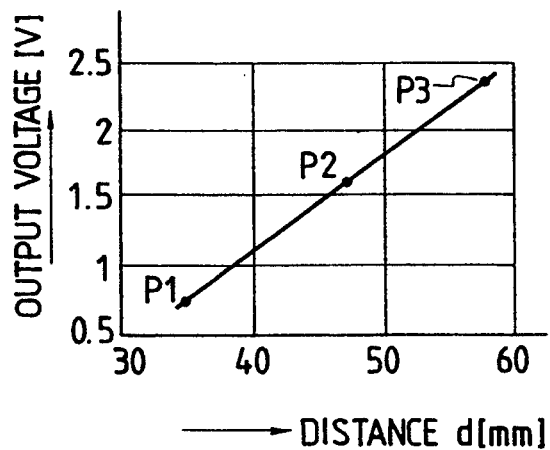
FIG. 7 is a graph to illustrate the relationship between the distance from the sensor to the surface of a wound fishline and the output voltage of the sensor.
Figure 13:
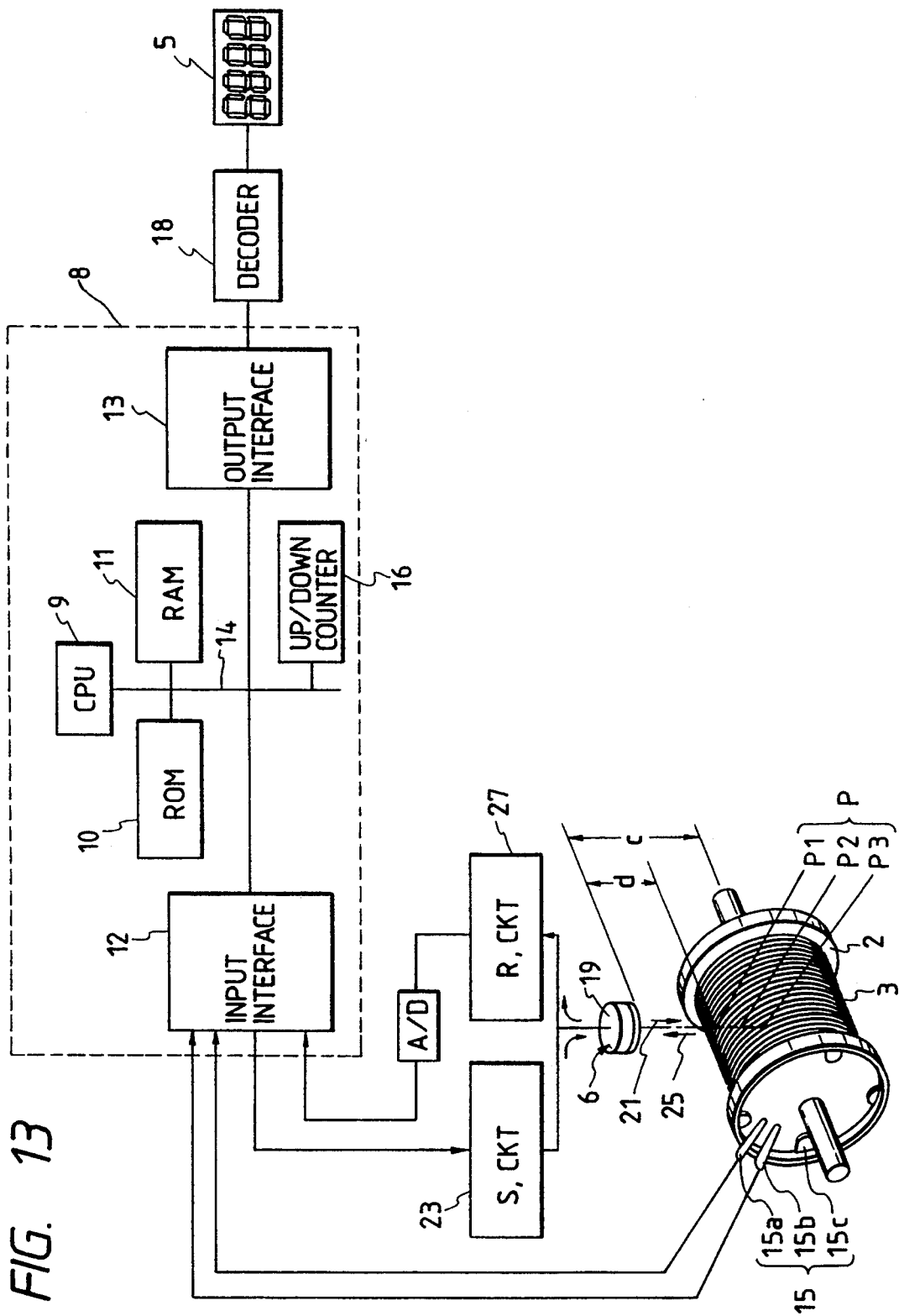
FIG. 13 is a schematic view of a fishline length measuring device, which is still another embodiment of the present invention, utilizing the relationship shown in FIG. 7 for calculating the distance d.

In addition, the voltage of the pulse which appears on the detection terminal 30 at the time of the unwinding or winding of the fishline from or onto the spool has a linear relationship with the actual measurement of the distance d from the surface of the ultrasonic sensor 19 to that P of the wound fishline 3 on the spool 2, as shown in FIG. 7, so that the voltage of the pulse can be used for determining the distance d in stead of the use of the time period Δt. This system for utilizing this linear relationship is shown in FIG. 13. In this system, the voltage is converted into digital data by an A/D convertor, and the digital data is then input through the input interface 12 into the central processing unit 9. The linear relationship between the voltage and the distance d is stored in advance in ROM 10.

Figure 9:
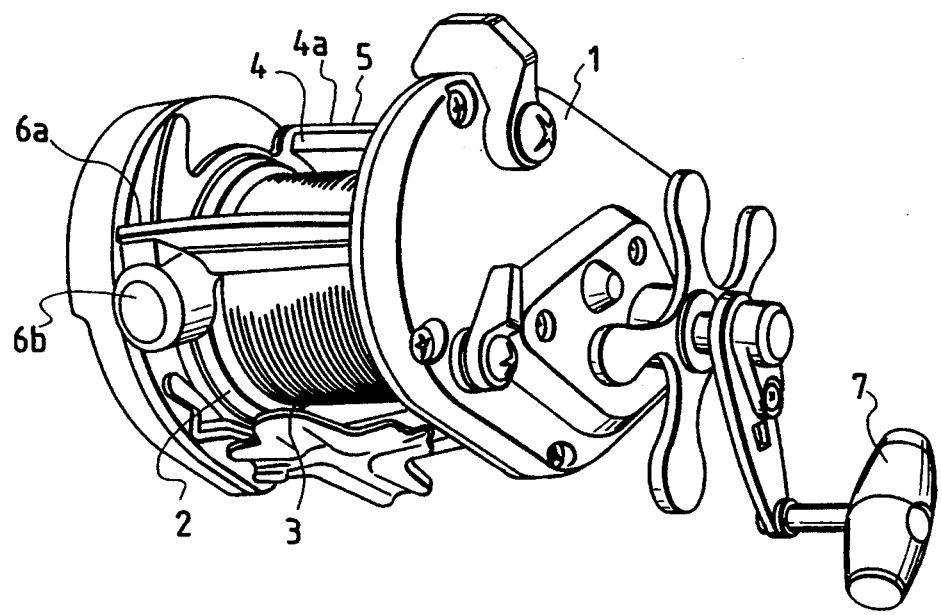
FIG. 9 is a perspective view of a fishing reel provided with a fishline length measuring device which is another embodiment of the present invention.

FIG. 9 shows a device which is another of the embodiments of the present invention and is for measuring the unwound and wound length of a fishline from and onto the spool of a fishing reel. The difference of the device from the preceding one is that the device shown in FIG. 9 includes a fishline winding diameter detector 6b disposed under the thumb rest of the reel.

Figure 11:
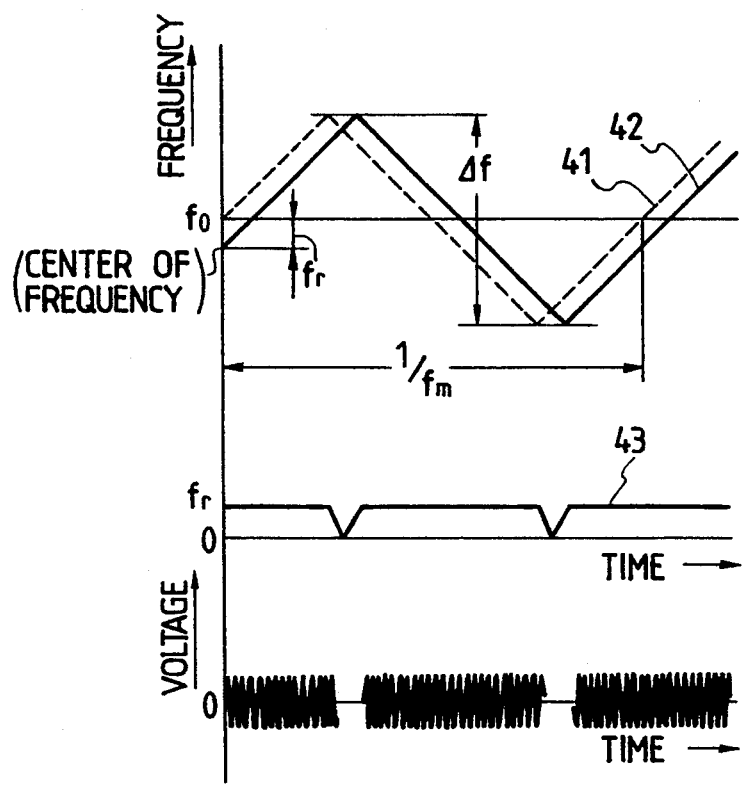
FIG. 11 is a time chart to illustrate the frequency of a beat signal.
Figure 12:
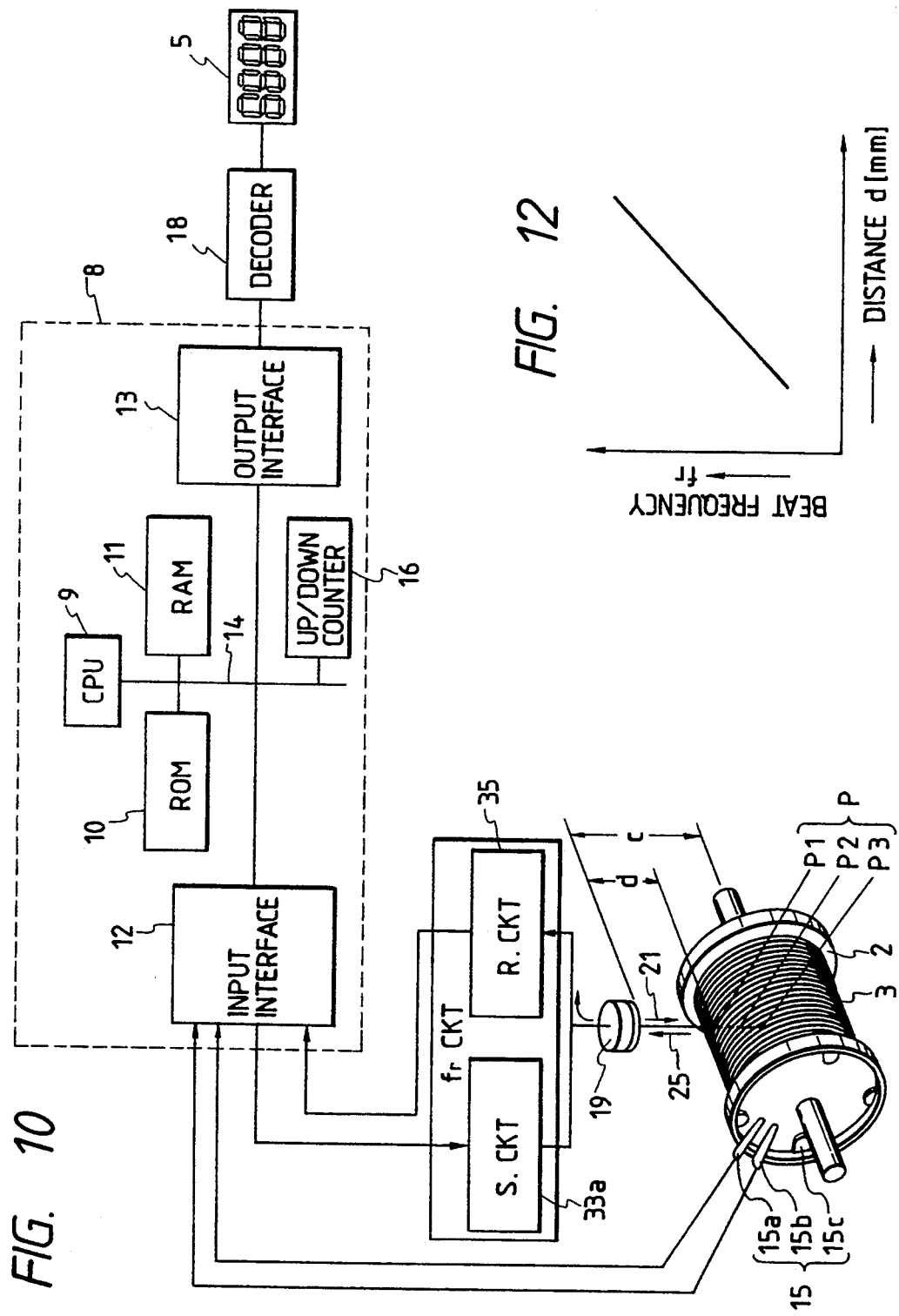
FIG. 12 is a graph to illustrate the relationship between the distance from an ultrasonic sensor to a wound fishline and the frequency of the best signal.

FIG. 10 show a device which is yet another of the embodiments and is for measuring the unwound and wound length of a fishline 3 from and onto the spool 2 of a fishing reel. The device includes a fishline winding diameter measuring unit which emits an ultrasonic wave beam 21 to the surface P of the wound fishline 3 on the spool 2 to measure the diameter of the winding of the fishline thereon. The measuring unit includes sending means 33, reception means 35, distance measuring means, and fishline winding diameter calculation means, as main components. When a fishline diameter measurement command signal is applied to the sending means 33 through the input interface 12 of a microcomputer 8, an ultrasonic wave sending voltage 41 (FIG. 11) which is frequency-modulated by the modulator 33a is supplied from the sending means to an ultrasonic sensor 19 to cause it to emit the ultrasonic wave beam 21 to the surface P of the wound fishline 3 on the spool 2. An ultrasonic wave reception voltage 42 induced in the sensor 19 when it receives the beam 25 reflected by the surface P of the wound fishline 3 after being emitted by the sensor is received by the reception means 35. The distance d between the sensor 19 and the wound fishline 3 on the spool 2 is determined by the distance measuring means in terms of the frequency fr of a beat signal 43 generated by mixing the sending voltage 41 and the reception voltage with each other. The relationship between the frequency fr of the beat signal and the distance d is a linear one as shown by an equation below and FIG. 12. For that reason, the distance d can be accurately measured.

$$fr = 4d.fm.\Delta f/v$$

In the equation, fm, $\Delta f$ and v denote the frequency of the modulation, the width of the band of the frequency, and the acoustic velocity (331 m/sec.), respectively. The wave reception voltage 42 to be mixed with the wave sending voltage 41 is a voltage amplified to a prescribed magnitude by a plurality of amplification circuits provided in the reception circuit of the reception means 35. Fishline winding diameter data indicative of the magnitude of the diameter of the wound fishline 3 on the spool 2 are generated through the calculating action of the fishline winding diameter calculation means on the basis of the distance d determined by the distance measuring means.

Figure 14:
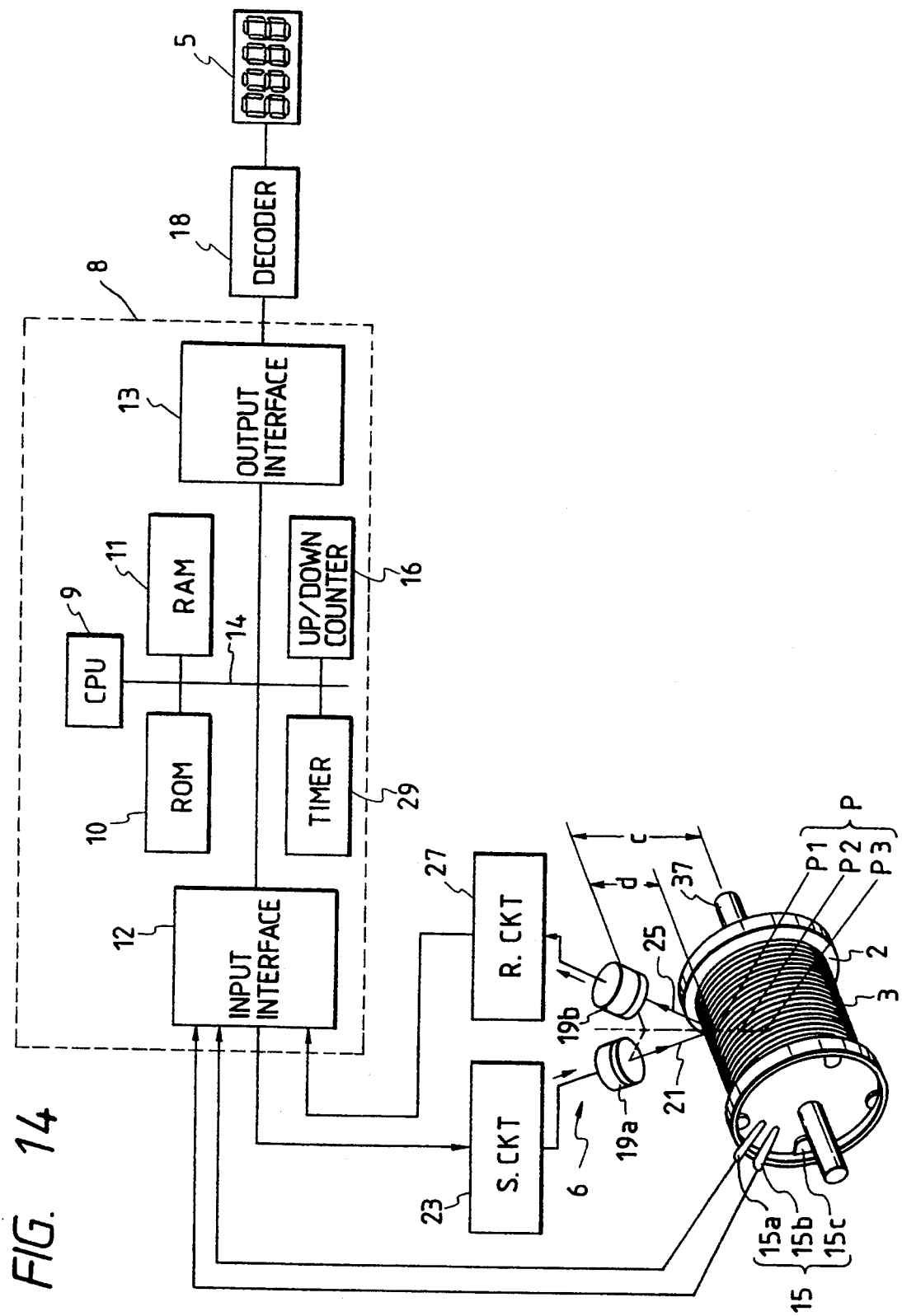
FIG. 14 is a schematic view of a fishline length measuring device which is yet another embodiment of the present invention and is provided with two ultrasonic sensors.
Figure 15:
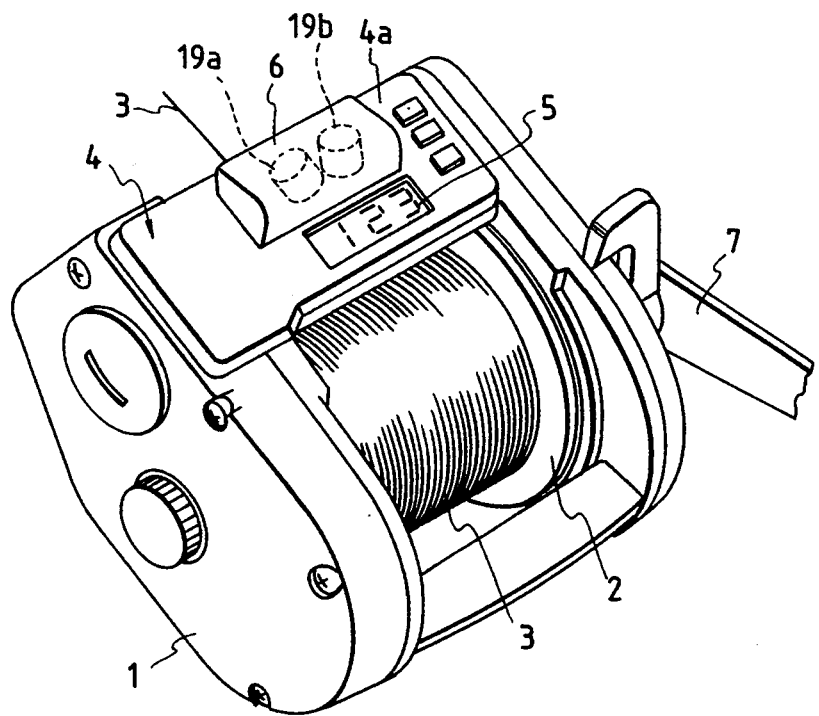
FIG. 15 is a perspective view of a fishing reel provided with the device shown in FIG. 14.
Figure 16:
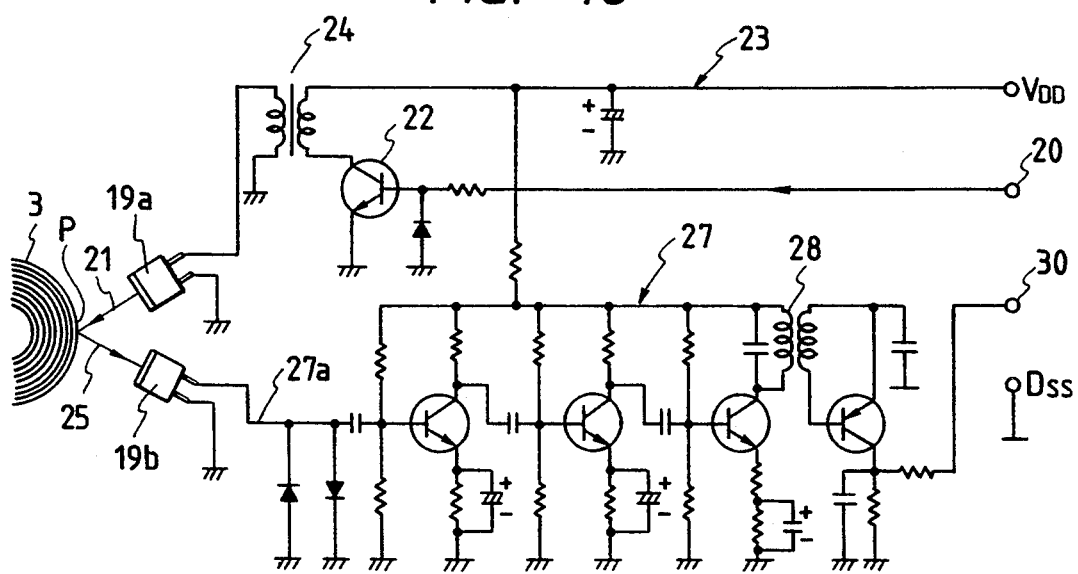
FIG. 16 is a wiring diagram of sending and reception circuits for the fishline winding diameter detector of the device shown in FIG. 14.

FIGS. 14 to 16 show a fishline length measuring device according to yet another embodiment of the present invention. In this device, the detector 6 includes two separate ultrasonic wave sensors 19a and 19b, i.e. an emitter 19a for emitting an ultrasonic wave beam 21 onto the surface of the fishline 3 wound on the spool 2 and a receiver 19b for receiving the reflected ultrasonic wave beam 25 therefrom. Each of the emitter 19a and the receiver 19b has the same construction as that of the ultrasonic wave sensor 19 shown in FIGS. 3 and 4. However, as noted above, the emitter 19a is used only for emitting the ultrasonic wave beam 21 and the receiver 19b is used only for receiving the reflected ultrasonic wave beam 25, and further these sensors 19a and 19b are separated from each other. Accordingly, even if a pulse signal of high voltage is applied from the sending circuit 23 to the emitter 19a and the emitter 19a emits the ultrasonic wave beam 21 thereupon, the reverberation caused on the emitter 19a is prevented from being transmitted to the receiver 19b so that the receiver 19b can accurately detect the reflected ultrasonic wave beam 25 regardless of such reverberation. Generally, the reverberation remains on the sensor in a predetermined time period from the emission of the ultrasonic wave beam therefrom, so that the reflected ultrasonic wave beam may reach the sensor before the reverberation is disappeared on the sensor and the reflected beam reflected on the surface of the wound fishline may be mixed with the reverberation if the distance d is short. This phenomenon makes it difficult to accurately detect the time period $\Delta t$ between the emission of the ultrasonic wave beam and the reception of the beam. Therefore, this arrangement of providing the separate emitter and receiver 19a and 19b is particularly applicable for a small sized fishing reel and preferable for manufacturing a small sized fishing reel since the adverse effect of the reverberation caused due to a common sensor for both emitting the ultrasonic wave beam and receiving the reflected ultrasonic wave beam is made greater as the distance d to be measured is made shorter.

Figure 17:
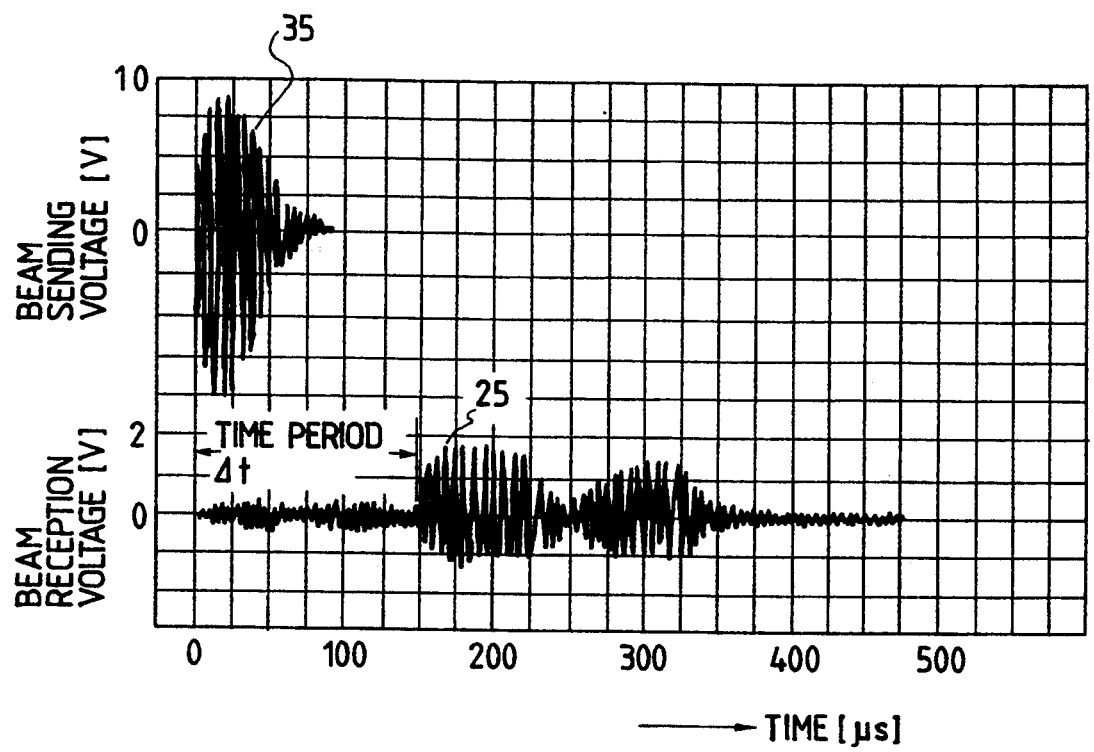
FIG. 17 is a time chart to illustrate the relationship between the emission and reception of an ultrasonic wave beam by the sensors of the device shown in FIG. 14.
Figure 18:
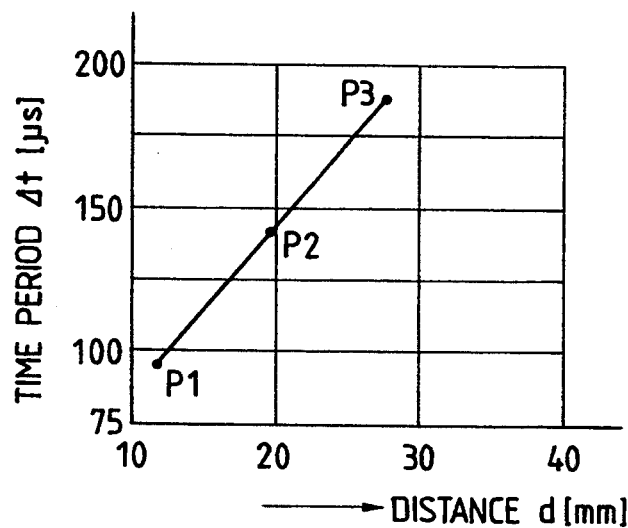
FIG. 18 is a graph to illustrate the relationship between the distance d and the time period $\Delta t$ in the device shown in FIG. 14.

The time period $\Delta t$ from the emission of the beam 21 from the emitter 19a through the action of the sending circuit 23 to the reception of the reflected beam 25 by the receiver 19b through the action of the reception circuit 27, is measured by the timer 29. In FIG. 17, for example, the timer 29 detects the time period 150 $\mu$sec between the emission and the reception. FIG. 18 shows the plotted relationship between the results of the actual measurement of both the distance d from the surface of the ultrasonic sensor 19 to that P of the wound fishline 3 on the spool and the time period $\Delta t$. The relationship becomes a linear one. This relationship is stored in ROM 10 and used for calculating the distance d on the basis of the detected time period $\Delta t$.

Figure 19:
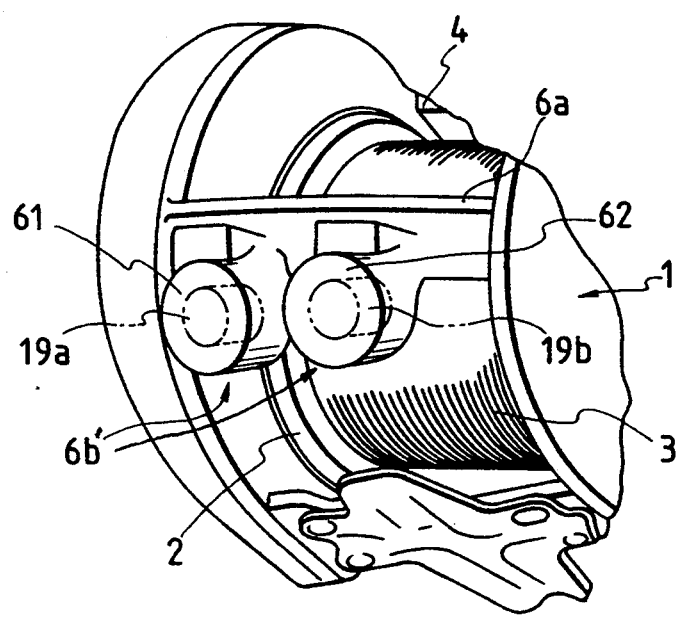
FIG. 19 is a perspective view of a fishing reel provided with a fishline length measuring device which is further another embodiment of the present invention.

FIG. 19 shows a fishline length measuring device according to still another embodiment of the present invention. In the device, a pair of fishline winding diameter detectors 6b are provided under the thumb rest 6a. A pair of sensor mounting portions 61 and 62 are projectingly, integrally formed on the thumb rest 6a with a predetermined distance therebetween. The emit only ultrasonic wave sensor 19a is mounted on one (61) of the mounting portions, whereas the receive only ultrasonic wave sensor 19b is mounted on the other (62).

Since the sensors 19a and 19b are disposed, respectively, on the sensor mounting portions 61 and 62 with the predetermined distance therebetween, the sensors 19a and 19b are surely prevented from being put into a bridge condition due to a water adhered thereto. If the sensors 19a and 19b are disposed close to each other, the sensors 19a and 19b may be put into such bridge condition that these sensors are connected to each other through the water adhered thereon during fishing. In such bridge condition, the vibration of the ultrasonic wave beam emitted from the sensor 19a is transmitted from the sensor 19a through the water to the sensor 19b so that the sensor 19b suffers from a problem in that it is difficult to accurately detect the reflected ultrasonic wave beam and to accurately measure the distance d. This problem can be solved by separately providing the sensor 19a and 19b with the predetermined distance therebetween as of the embodiments of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraced therein.

What is claimed is:

1. A fishing reel comprising:
a reel body;
a spool rotatably supported on the reel body for winding a fishline thereon;
sensing means for detecting a rotation of the spool;
an up/down counter for up and down counting pulse signals output from the sensing means;
measuring means for measuring a fishline winding diameter of a fishline wound on the spool by emitting an ultrasonic wave beam onto a surface of the fishline wound on the spool;
calculating means for calculating a length of the fishline on the basis of the measured fishline winding diameter and the counted pulse signals; and
a display for indicating the calculated length of the fishline.

2. The fishing reel according to claim 1, wherein the measuring means includes sending means for emitting the ultrasonic wave beam onto the surface of the wound fishline, reception means for receiving the ultrasonic wave beam reflected by the surface of the wound fishline, a timer for measuring a time period between the emission of the ultrasonic wave beam by the sending means and the reception of the ultrasonic wave beam by the reception means, and fishline winding diameter detecting means for converting the measured time period into an electric signal which is in proportion to the fishline winding diameter.

3. The fishing reel according to claim 2, wherein the sending and reception means includes a common ultrasonic wave sensor.

4. The fishing reel according to claim 3, further comprising mounting means for mounting said reel on a fishing rod wherein the sensor is provided between side plates of the reel body and opposite the mounting means with respect to the spool.

5. The fishing reel according to claim 3, wherein said fishline exits said reel at a forward portion of said reel, and the sensor is provided between side plates of the reel body and opposite the forward portion with respect to the spool.

6. The fishing reel according to claim 2, wherein the sending means includes an ultrasonic wave sensor and the reception means includes another ultrasonic wave sensor.

7. The fishing reel according to claim 6, further comprising mounting means for mounting said reel on a fishing rod, wherein the sensors are provided between the side plates of the reel body and opposite the mounting means with respect to the spool.

8. The fishing reel according to claim 6, wherein said fishline exits said reel at a forward portion of said reel, and the sensors are provided between the side plates of the reel body and opposite the forward portion with respect to the spool.

9. The fishing reel according to claim 1, wherein the measuring means includes sending means for applying a frequency modulated sending voltage onto a ultrasonic wave sensor to emits a ultrasonic wave beam from the sensor onto the surface of the fishline wound on the spool, reception means for receiving the ultrasonic wave beam reflected by the surface of the wound fishline to obtain reception voltage induced therein, distance measuring means for determining the distance between the sensor and the surface of the wound fishline in terms of a frequency of a beat signal generated by mixing the sending voltage and the reception voltage with each other, and fishline winding diameter calculation means for calculating data indicative of the fishline winding diameter of the basis of the determined distance.

10. The fishing reel according to claim 9, wherein the sending means and reception means include a common ultrasonic wave sensor.

11. The fishing reel according to claim 9, wherein the sending means includes an ultrasonic wave sensor and the reception means includes another ultrasonic wave sensor.

12. A fishline length measuring device adapted to a fishing reel having a spool rotatably supported on a reel body for winding thereon and unwinding therefrom a fishline, said fishline length measuring device comprising:
first means for detecting a direction of the rotation of the spool and providing a first signal indicative thereof;
second means for detecting a number of the rotation of the spool and providing a second signal indicative thereof;
third means for applying an ultrasonic wave beam onto a surface of the fishline wound on the spool and generating a third signal indicating the emission of the ultrasonic wave beam therefrom;
fourth means for receiving the ultrasonic wave beam emitted from the third means and reflected by the surface of the fishline wound on the spool and generating a fourth signal indicating the reception of the reflected ultrasonic wave beam thereby;
fifth means for measuring a time period $\Delta T$ between the generations of the third signal and of the fourth signal, and providing a fifth signal indicative thereof; and
sixth means for calculating a fishline length wound onto or unwound from the spool due to the rotation of the spool based on the first, second and fifth signals.

13. The device according to claim 12, further comprising:
seventh means for displaying the fishline length calculated by the sixth means.

14. The device according to claim 12, wherein said third and fourth means include a common ultrasonic wave sensor used for both emitting the ultrasonic wave beam therefrom and receiving the reflected ultrasonic wave beam thereby.

15. The device according to claim 14, wherein said sixth means includes means for calculating a distance d defined between the ultrasonic wave sensor and the surface of the fishline wound on the spool on the basis of the measured time period $\Delta T$, and means for calculating a diameter D of a circle defined by the surface of the fishline wound on the spool on the basis of the distance d.

16. The device according to claim 12, wherein said third means includes an ultrasonic wave sensor used only for emitting the ultrasonic wave beam therefrom, and said fourth means includes another ultrasonic wave sensor used only for receiving the reflected ultrasonic wave beam thereby.

17. The device according to claim 16, wherein said sixth means includes means for calculating a distance d defined by the ultrasonic wave sensors and the surface of the fishline wound on the spool on the basis of the measured time period $\Delta T$, and means for calculating a diameter D of a circle defined by the surface of the fishline wound on the spool on the basis of the distance d.

18. A fishline length measuring device adapted to a fishing reel having a spool rotatably supported on a reel body for winding and unwinding a fishline thereon, said fishline length measuring device comprising:

first means for detecting a direction of the rotation of the spool and providing a first signal indicative thereof;

second means for detecting a number of the rotation of the spool and providing a second signal indicative thereof;

third means having at least one ultrasonic wave sensor for applying an ultrasonic wave beam onto a surface of the fishline wound on the spool and receiving the ultrasonic wave beam emitted from the third means and reflected by the surface of the fishline wound on the spool;

fourth means for applying frequency-modulated sending voltage to said third means to emit the ultrasonic wave beam from said third means and for inducing a reception voltage on said third means when said third means receives the ultrasonic wave beam emitted from the third means and reflected by the surface of the fishline wound on the spool;

fifth means for mixing said sending voltage and said reception voltage with each other to generate a beat signal and providing a third signal indicative of a frequency fr of the beat signal; and sixth means for calculating a fishline length wound onto or unwound from the spool due to the rotation of the spool based on the first, second and third signals.

19. A method for measuring a fishline length wound onto and/or unwound from a spool rotated relative to a reel body of a fishing reel, comprising the steps of:

detecting a direction of the rotation of the spool and providing a first signal indicative thereof;

detecting a number of the rotation of the spool and providing a second signal indicative thereof;

detecting a fishline winding diameter D defined by a fishline wound on the spool by applying an ultrasonic wave beam onto a surface of the fishline wound on the spool and receiving the ultrasonic wave beam reflected by the surface of the fishline wound on the spool and providing a third signal indicative of the diameter D; and calculating the fishline length wound onto and/or unwound from the spool due to the rotation of the spool based on the first, second and third signals.

* * * * *